United States Patent [19]
Bryan

[11] 3,776,402
[45] Dec. 4, 1973

[54] LIFTING PLATFORM
[75] Inventor: Carl E. Bryan, Grand Rapids, Mich.
[73] Assignee: Grocers Baking Company, Grand Rapids, Mich.
[22] Filed: Aug. 2, 1971
[21] Appl. No.: 167,972

[52] U.S. Cl. .................................. 214/75 T, 187/9
[51] Int. Cl. .............................................. B60p 1/44
[58] Field of Search ............... 214/75 R, 75 T, 77 P, 214/38 BA; 187/9

[56] References Cited
UNITED STATES PATENTS

| | | | |
|---|---|---|---|
| 3,035,720 | 5/1962 | Selzer | 214/75 T |
| 2,553,156 | 5/1951 | Woodward | 214/75 T |
| 3,651,965 | 3/1972 | Simonelli et al. | 214/75 T |
| 2,873,868 | 2/1959 | Kringlen | 214/75 T |
| 2,792,079 | 5/1957 | Gibson | 214/38 BA |
| 1,933,211 | 10/1933 | Flowers | 214/38 BA |
| 479,533 | 7/1892 | Schultz | 214/38 BA |

Primary Examiner—Gerald M. Forlenza
Assistant Examiner—Lawrence J. Oresky
Attorney—Price, Heneveld, Huizenga & Cooper

[57] ABSTRACT

A truck, having an enclosed van including a door for access, has a hydraulically operated first platform mounted adjacent the side of the van by the door opening. The platform includes a pair of guide members slidably mounted to guide supports on either side of the door. A pair of hydraulic cylinders mounted on either side of the door opening have lifting rods actuated by the hydraulic cylinders and coupled to the platform such that the platform can be raised or lowered from the ground level to the floor level of the van. The first platform includes a hinged second platform which in a loading position is generally horizontal for receiving and discharging goods and when in a retracted position is vertically oriented and locked into position by locking means. The system is relatively inexpensive and can be easily removed from one truck and mounted to another truck.

12 Claims, 4 Drawing Figures

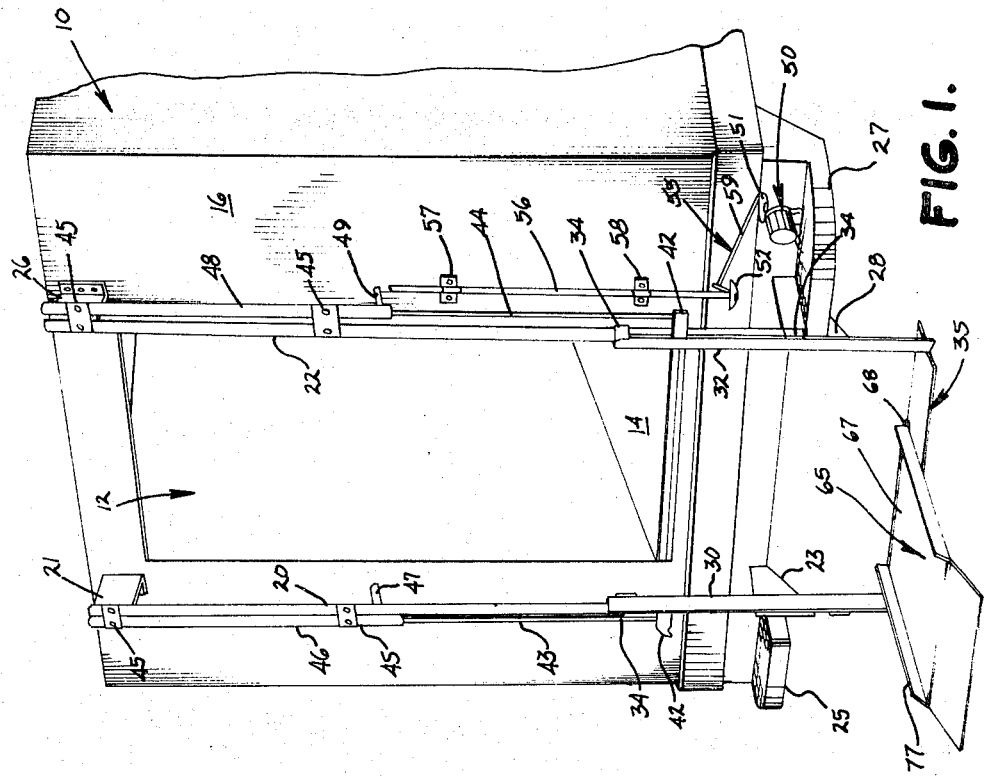
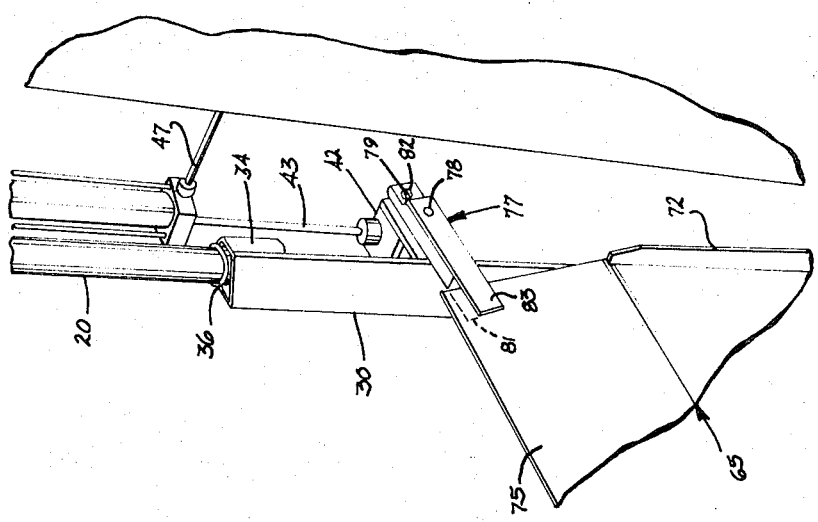

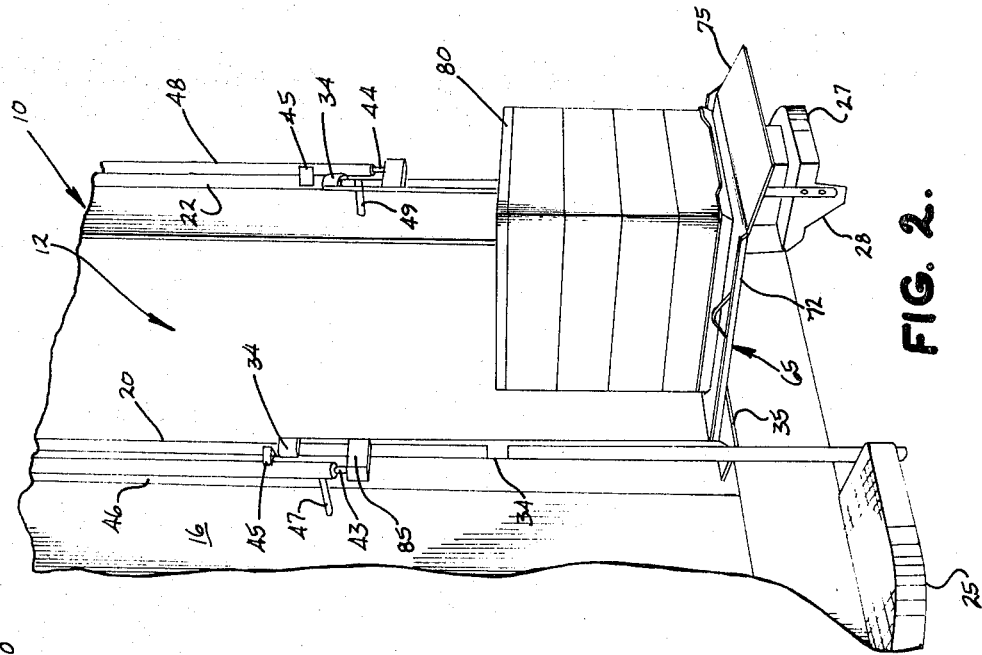
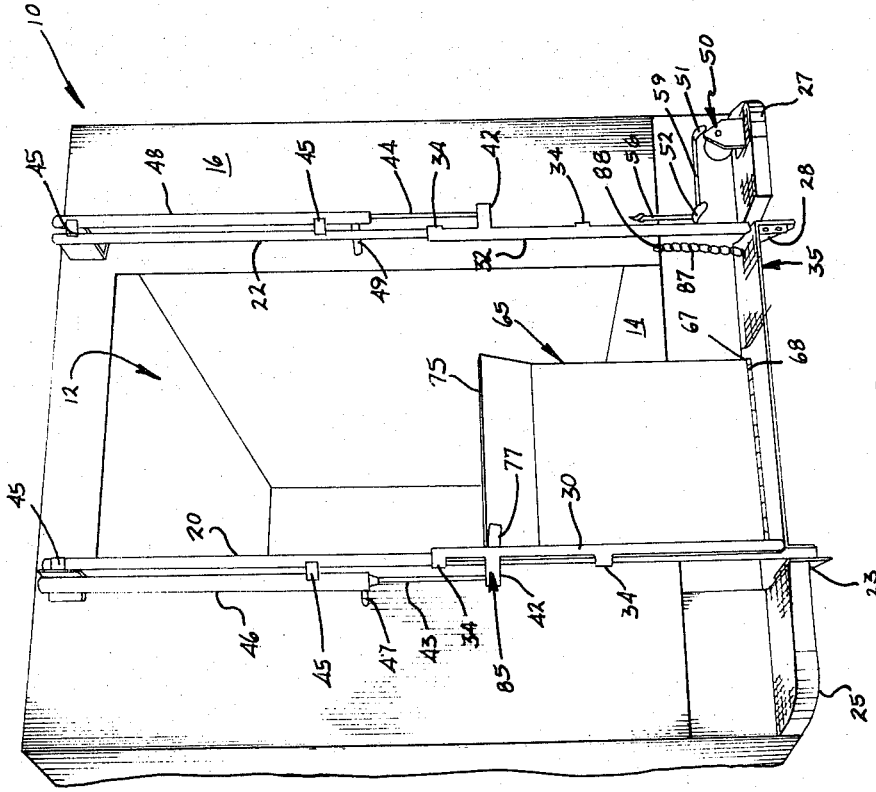

LIFTING PLATFORM

BACKGROUND OF THE INVENTION

The present invention relates to hydraulically operated lift platforms adapted to be used with a relatively small van-type of truck.

In many delivery truck operations, it is desirable to have an automatic lifting platform attached to the van of the truck for aiding the driver-delivery man in the frequent loading and unloading of heavy loads into and out of the truck. It has been impracticable however, to supply small delivery trucks with a permanent factory installed hydraulic lift and platform mechanism since it would greatly increase the cost of the truck as it is not a standard item that most buyers require. Thus, the driver-delivery man of relatively small trucks must manually lift packages, goods, or the like from the truck to the ground level and vice versa or from a loading platform into the truck and vice versa. In some cases, he can carry a hydraulically operated dolly which, of course, must be lifted into and out of the truck. With either method, the driver is faced with heavy lifting when the truck is used for carrying relatively heavy packages.

SUMMARY OF THE INVENTION

The lift arrangement of the present invention provides a relatively inexpensive add-on feature for a delivery truck which can be installed with relative ease and which can be removed from one truck to another as one truck is sold or no longer requires the lift. When used with a truck having a rear door, the lift platform of the present invention forms an integral part of the rear bumper when the loading platform is in its stored or traveling position.

It is an object, therefore, of the present invention to provide an inexpensive hydraulically operated lift platform for a relatively small truck;

It is an additional object of the present invention to provide a lift platform having a horizontal position movable in a vertical direction for loading and unloading of goods into and from the truck, and a locked-in-place vertical stored position when the truck is in motion;

It is still a further object of the present invention to provide a hydraulically operated lift platform for a truck having a rear door such that the platform forms an integral part of the rear bumper when the truck is in motion.

Lifts embodying the present invention include a first platform slidably mounted to vertical support structures on either side of a loading door of the van portion of a truck. Attached to the first platform is a hingedly mounted second platform which when in the loading position is parallel to the first platform in a generally horizontal plane and is vertically movable for loading and unloading of the truck. In the retracted position the second platform is approximately perpendicular to the first platform and is locked in place. Hydraulically operated cylinders are mounted on either side of the door opening and include lift rods coupled to either side of the first platform for raising and lowering the first and second platforms between the ground level and the truck van floor level.

BRIEF DESCRIPTION OF THE DRAWINGS

FIG. 1 is a perspective view showing the lift platform mounted to a van type of vehicle; the platform being lowered to the ground level;

FIG. 2 is a perspective view showing the lift platform raised to a loading position level with the floor of the van and having metal racks resting upon it;

FIG. 3 is a perspective view showing the lift platform in its stored position in which it is locked when the truck is in motion; and FIG. 4 is a close-up view of the locking mechanism taken from inside the truck van.

DETAILED DESCRIPTION OF THE PREFERRED EMBODIMENT

Referring now in detail to the figures, there is shown a van body portion 10 of a truck which includes an access door 12 to allow packages and the like to be loaded on the floor area 14 inside the van body. The access door 12 is in the preferred embodiment an overhead roll-up type of door (not shown) with an opening formed in the rear wall 16 of the van. Mounted to the wall 16 on either side of the access door 12 is a pair of cylindrical support members 20 and 22. The left support member 20 mounted to the left side of the access door has one end bolted to an upper bracket 21 which is in turn bolted to the rear wall 16 of the van. The lower end of member 20 is attached to a lower bracket 23 which is bolted or welded to the bumper portion 25 of the van. The right support bracket 22 is likewise bolted to the rear wall 16 of the van by means of an upper bracket 26 and to the bumper portion 27 of the van by means of a lower bracket 28. Members 20 and 22 are generally parallel to one another and parallel to the surface of the rear wall 16 of the truck. They extend vertically from above the access door 12 down to the bumper sections 25 and 27.

Slidably mounted to the vertical support members 20 and 22 are guide members 30 and 32 between which a first platform 35 is welded at the lower end of the guide members. Members 30 and 32 comprise angle iron pieces which each include two sections of pipe 34 welded at a spaced interval on each of the guide members. The pipe 34 has an inner diameter greater than the outer diameter of the cylindrical support members 20 and 22. A nylon insert 36 is mounted between each of the pipe sections 34 and the support members 20 and 22 (see FIG. 4). Thus, the first platform 35 is vertically movable by means of the guide members 30 and 32 sliding on the support members 20 and 22, respectively.

Hingedly mounted to the first platform 35 is a second platform 65 having a rear edge 67 mounted to the rear edge of the first platform 35 by means of a piano-type hinge 68 shown in FIGS. 1 and 2. Platform 65 includes left and righ edge members 72 and 74 and a beveled front lip 75 which contacts the ground when the platform is lowered as shown in FIG. 1. The second platform 65 is supported by the hinge 68 and the top surface of the first platform 35 when in the horizontal position as shown in FIG. 2 with a load 80 mounted thereon. In one application the van was employed to make wholesale bakery goods deliveries. In that application, the load 80 comprised a group of relatively heavy wire baskets for holding baked goods.

A pair of hydraulic cylinders 46 and 48 are securely mounted to the upper portion of the support members 20 and 22 respectively by means of brackets 45. Each of the cylinders have lift rods (43 and 44 associated with cylinders 46 and 48 respectively) which are an integral part of each of the cylinders. The lift rods are coupled to the pistons included in the cylinders (not shown) and move into or out of the cylinders as the hydraulic pressure in the cylinder is changed. The vertically movable lift rods are attached at one end to a bracket 42 on each guide member 30 and 32. Thus as the lift rods move into or out of the respective cylinder the platforms 35 and 65 will be raised or lowered.

The hydraulic cylinders 46 and 48 are supplied hydraulic fluid by means of hydraulic hoses 47 and 49 respectively (FIGS. 1 and 2) which are coupled to a hydraulic pump and motor unit 50 mounted on the bumper section 27 of the van 10. The unit 50 is actuated by means of a lever arm assembly 55 which includes a lever arm 56 slidably mounted by means of brackets 57 and 58 to the rear wall 16 of the van 10. The lever arm 46 is coupled to a combination switch and valve 51 on the unit 50 by means of a linkage arm 59 pivotally coupled to arm 56 by means of pivot 52.

In the retracted position (FIG. 3) platform 65 is locked into place by means of a fork-shaped locking member 77 which is pivotally mounted to bracket 42 associated with the left guide member by means of a bolt 78 (FIG. 4). The locking member 77 includes tines 81 and 83 which straddle the front lip 75 of platform 65 as shown in FIG. 4 when in the locked position. The locking member 77 is held in position by means of a spring loaded locking pin 79 (FIG. 4) having a T-shaped handle 85 (FIGS. 2 and 3) and a spring loaded shaft portion which projects through bracket 42 into an aperture 82 in member 77 (FIG. 4). To release the locking member 77 (and platform 65) handle 85 is pulled out, thereby removing pin 79 from aperture 82 such that member 77 can be swung upwardly and the second platform 65 can be pivoted about the hinge 68 to lower it to the horizontal position shown in FIGS. 1 and 2. When in the retracted position, the spring loaded locking pin 79 will prevent the locking members 77 from pivoting and thereby hold the second platform 65 in an approximate vertical position, as shown in FIGS. 3 and 4.

A safety chain 7 has one end securely attached to the van by means of a bolt 88. The other end of chain 87 is removably hooked to platform 35 by a suitable hook (not shown) which is coupled to platform 35 when the truck is in motion to insure that the lift will be held in its raised position in the event of a hydraulic fluid leak or valve failure.

OPERATION

To utilize the lift platform from its retracted position shown in FIG. 3 it is necessary first to unhook the safety chain 87 from the platform 35. Next the second platform 65 is lowered into its horizontal position by pulling the T-handle 85 which releases latch 77, lifting latch 77 and allowing the second platform 65 to be lowered to its horizontal position where it is supported by the hinge 68 and first platform 35. The entire platform then can be lowered into the position shown in FIG. 1 (i.e., ground level) by moving lever 56 downwardly to operate the check valve in unit 51 such that the hydraulic pressure is released in the hydraulic cylinders 46 and 48. As this platform 65 slowly lowers by sliding downwardly between the support members 20 and 22 until it rests on the ground as shown in FIG. 1.

The packages 80 (FIG. 2) can then be placed on the platform 65 which is raised by lifting the lever arm 56 which serves to actuate the electric motor associated with the hydraulic pump unit 50 so that hydraulic pressure is applied to the cylinders by means of the hydraulic hoses 47 and 49 coupled between the pump and the cylinders. As the fluid is forced into the cylinders the lift rods 43 and 44 raise thereby raising platform 65 and the packages 80 thereon up to the floor level of the van 10 as shown in FIG. 2. The packages 80 can then be easily slid onto the floor 14 of the van. Platform 65 can then again be lifted into its retracted position shown in FIG. 3. The locking mechanism 77 is then dropped over the forward lip 75 of the platform to lock it into place and the safety chain 87 is coupled to platform 35. It is noted that the width of platform 65 can be somewhat less than the width of platform 35 thereby allowing a step-through space on the right side of platform 65 as shown in FIG. 3 such that the driver-deliveryman can gain access to the inside of the van without the necessity of operating the platform. This facilitates the loading and unloading of relatively small packages in which the use of the platform is not required. The motion of the platform is controlled by the lever arm 56 which may be spring loaded such that it will return to its neutral position and such that it must be lifted to raise the platform by actuating the hydraulic pump, or depressed downwardly to lower the platform by releasing the hydraulic pressure in the cylinders. This platform can be stopped at any position between the two extreme levels by relieving the lever arm 56. Other control arrangements could likewise be employed. The lift arm 56 may include means for locking the arm into its neutral position such that only the driver with a key can operate the platform. The components of the lifting platform such as the support members, guide members, hydraulic cylinders, etc. are commercially available items which reduce the manufacturing costs of the lift since no specially manufactured parts are required. In the preferred embodiment, the hydraulic cylinders were 1 inch in diameter with a 42 inch travel and had a lifting capability together of 3,000 pounds. Various modifications to the preferred embodiment of the present invention will become apparent to those skilled in the art and will fall within the scope of the present invention.

The embodiments of the invention in which an exclusive property or privilege is claimed are defined as follows:

1. A lifting platform adapted to be mounted adjacent an access door of a van-type of truck comprising:
   a first platform slidably mounted at either side thereof to a pair of support members vertically mounted one on either side of said access door;
   a second platform having a width less than the width of said first platform and a length greater than twice the length of said first platform, said second platform hingedly mounted to one edge of said first platform such that said second platform can be lowered into a position overlaying said first platform to be solely supported thereby or raised to a position approximately perpendicular to said first platform;
   a pair of hydraulic cylinders, one being mounted on either side of said access door and rigidly mounted to said van portion of said truck, said cylinders including lift rods mounted to said first platform;

a source of pressurized hydraulic fluid; and
means for selectively supplying said fluid to said hydraulic cylinders to lower and raise said first and second platforms between first and second positions.

2. A combined lifting platform and bumper adapted to be mounted adjacent a rear access door of a van-type of truck comprising:
first and second bumper segments mounted on opposite sides of the access door of the truck;
a first platform slidably mounted at either side thereof to a pair of support members vertically mounted one on either side of said access door;
a second platform hingedly mounted to one edge of said first platform such that said second platform can be lowered into a position parallel with said first platform or raised to a position approximately perpendicular to said first platform;
a pair of hydraulic cylinders, one being mounted on either side of said access door and rigidly mounted to said van portion of said truck, said cylinders including lift rods mounted to said first platform;
a source of pressurized hydraulic fluid; and
means for selectively supplying said fluid to said hydraulic cylinders to lower and raise said first and second platforms between first and second positions wherein said support members are positioned such that said first platform is mounted between first and second bumper segments of said truck to form an integral part of the bumper when said first and second platforms are in said second position.

3. The mechanism of claim 1 wherein in said first position, said second platform is at ground level and in said second position said second platform is approximately level with a floor portion of said van.

4. The mechanism of claim 3 and further including locking means mounted to one of said support members for locking said second platform in said approximate vertical position.

5. A lifting mechanism as defined in claim 3 wherein said first and second platforms can be raised or lowered to any rest position between said first and second positions.

6. The mechanism of claim 1 wherein said means for selectively supplying hydraulic fluid to said hydraulic cylinders includes;
a hydraulic pump;
an electrical motor for actuating said pump;
control means for operating said motor,
a valve for relieving hydraulic pressure in said hydraulic cylinders; and
means for actuating said valve.

7. A mechanism of claim 6 and further including a safety chain having one end mounted to said truck and another end removably mounted to said first platform for holding said first platform at a preselected vertical position.

8. A vertically movable lift platform mounted adjacent an access door of a van-type truck, said platform comprising a first platform slidably mounted by guide brackets at either edge thereof to a pair of support members vertically mounted adjacent said access door at either side of said door, a pair of hydraulic cylinders rigidly mounted to said support members and including lift rods coupled to said guide members, a second platform having a width less than the width of said first platform and a length at least twice the length of said first platform, said second platform hingedly mounted at one edge thereof to one edge of said first platform such that said second platform can be rotated from an approximate vertical position to an approximate horizontal position, said second platform overlaying said first platform to be solely supported thereby when in the approximate horizontal position, locking means pivotally coupled to one of said guide means for holding said second platform in said approximate vertical position when said locking means are engaged, and means for selectively operating said hydraulic cylinders such that said first and second platforms can be raised and lowered.

9. The lift platform as defined in claim 3 wherein said means for selectively operating said hydraulic cylinders comprise: a source of hydraulic fluid, a pump coupled to said source of fluid, an electrical motor for actuating said pump, control means for operating said motor, a check valve for relieving hydraulic pressure in said hydraulic cylinder, and means for actuating said check valve.

10. A vertically movable lift platform mounted adjacent an access door of a vantype truck, said platform comprising a first platform slidably mounted by guide brackets at either edge thereof to a pair of support members vertically mounted adjacent said access door at either side of said door, a pair of hydraulic cylinders rigidly mounted to said support members and including lift rods coupled to said guide members, a second platform hingedly mounted at one edge thereof to one edge of said first platform such that said second platform can be rotated from an approximate vertical position to an approximate horizontal position, wherein the width of said second platform is less than the width of said first platform thereby providing a space between said second platform when in said vertical position such that access can be gained to said van portion of said truck through said access door, locking means pivotally coupled to one of said guide means for holding said second platform in said approximate vertical position when said locking means are engaged, and means for selectively operating said hydraulic cylinders such that said first and second platforms can be raised and lowered, said means including a source of hydraulic fluid, a pump coupled to said source of fluid, an electrical motor for actuating said pump, control means for operating said motor, a check valve for relieving hydraulic pressure in said hydraulic cylinder, and means for actuating said check valve.

11. The mechanism as defined in claim 1 wherein the width of said second platform is selected to permit access to the door of the van adjacent which said mechanism is mounted when said second platform is in a raised position.

12. The mechanism as defined in claim 8 wherein the width of said second platform is selected to permit access to the door of the van adjacent which said mechanism is mounted when said second platform is in a raised position.

* * * * *